United States Patent [19]

Yamashita et al.

[11] Patent Number: 5,002,339
[45] Date of Patent: Mar. 26, 1991

[54] AUTOMOTIVE SEAT HINGE COVER

[75] Inventors: Takashi Yamashita; Hiroaki Iwamoto; Akihiko Hoshino; Takashi Hosoe, all of Kanagawa, Japan

[73] Assignee: Ikeda Bussan Co., Ltd., Ayasse, Japan

[21] Appl. No.: 455,253

[22] Filed: Dec. 22, 1989

[30] Foreign Application Priority Data

Feb. 25, 1989 [JP] Japan .................. 1-20942

[51] Int. Cl.⁵ .............................. B60N 2/02
[52] U.S. Cl. .................... 297/355; 297/362
[58] Field of Search ............. 297/355, 356, 361, 362, 297/353, 354; 16/250, 251; 403/23

[56] References Cited

U.S. PATENT DOCUMENTS

| | | | |
|---|---|---|---|
| 4,176,424 | 12/1979 | Rock et al. | 16/250 |
| 4,633,546 | 1/1987 | Bergs | 16/250 X |
| 4,685,734 | 8/1987 | Brandoli | 297/355 |
| 4,708,392 | 11/1987 | Werner et al. | 297/355 X |
| 4,736,986 | 4/1988 | Kato et al. | 297/362 X |
| 4,762,366 | 8/1989 | Bauer et al. | 297/355 X |

Primary Examiner—Jose V. Chen
Attorney, Agent, or Firm—Foley & Lardner

[57] ABSTRACT

A pair of cover half members are attached to each other and to a seat hinge base plate in such a manner as to enclose the base plate. The respective cover halves each snap directly onto the base plate at a single point on their lower sides. At their upper sides the covers snap onto each other. The connection between the covers and the base plate is firm but is still resilient enough to allow sufficient movement between the cover assembly and the base plate in the event that large forces or shocks are applied to the cover. The connection between the cover halves is sufficiently strong that forces acting on the cover halves cannot readily force them apart nor cause them to become detached from the base plate.

10 Claims, 5 Drawing Sheets

AUTOMOTIVE SEAT HINGE COVER

BACKGROUND OF THE INVENTION

1. Field of the Invention

The instant invention relates to a cover for a seat hinge of an automobile seat the back of which is pivotably mounted on the seat cushion portion. More specifically, the present invention relates to a seat hinge cover which is formed in such a manner as to be inexpensive to build and easy to install. Still more specifically, the instant invention relates to a seat hinge cover which, while being easily installed, is not easily knocked loose from the seat hinge.

2. Description of the Prior Art

FIGS. 1 and 2 show a seat hinge cover typifying the type of prior art arrangements which have been hitherto proposed.

Referring to FIG. 1, a seat hinge 1 and a prior art seat hinge cover 3 are depicted in an exploded view. The seat hinge 1 comprises a base plate 2 by which the seat back is supported on the seat cushion. The base plate 2 is formed with a hinge cover alignment hole 4. The base plate 2 also comprises an outwardly projecting peripheral edge or flange 6 (see FIG. 2).

In order to conceal the seat hinge base plate 2, a seat hinge cover 3 is provided. The seat hinge cover 3 in this instance is formed of a resilient shock resistant material. The seat hinge cover 3 includes a flat web section 3a which is slightly larger, and approximately the same shape as the base plate 2. A projecting flange portion 3b is formed around the periphery of the cover so as to enclose and conceal the outer periphery of the seat hinge base plate 2 when installed thereon. The seat hinge cover 3 also comprises a resilient hook 7 at the upper side thereof and an inwardly projecting alignment pin 5.

The seat hinge cover 3 formed in the above manner, can easily and very quickly be attached to the base plate 1 during the seat assembly process by simply pressing it onto the base plate 1 so that the alignment pin 5 slides into the alignment hole and the resilient hook 7 snaps over an upper portion of the flange 6.

Once installed, the alignment pin eliminates play in the vertical direction so as to cooperate with the hook to maintain the seat hinge cover 3 on the base plate 1.

However, the above described hinge cover, while being extremely easy to install, suffers the drawback that it is relatively easily shaken loose by shocks occuring during normal use of the seat.

The ease with which the seat hinge cover 3 according to the prior art can come loose is partly due to the fact that shocks to the seat hinge cover 3 deform the resilient material thereof but have essentially no effect whatsoever on the base plate 2 on which the cover 3 is attached. In other words, shocks to the seat hinge cover 3 deform the resilient material of the alignment pin 5 and the hook 7 causing them to become disengaged from their respective locations.

On the other hand, attempts to make a more firm attachment between the seat hinge cover and the base plate, such as stiffening the hook member 7, have the result that the seat hinge cover becomes more difficult to attach. This of course tends to hinder production of the seats.

In addition, if fastening means, such as screws (for example), are used to form a more permanent connection between the cover 3 and the the seat hinge base plate 2, stresses from shocks to the seat hinge cover tend to concentrate at the rigid connection point between the seat hinge cover member 3 and the seat hinge base plate 2. Over a period of time these concentrated stresses have a strong tendency to cause the material of the seat hinge cover to crack. This is unsightly and can have the result that the seat hinge cover comes loose from the seat hinge base plate in spite of the added attachment measures.

SUMMARY OF THE INVENTION

It is an object of the instant invention to provide a seat hinge cover assembly which is easy to install on the member of the seat hinge to be covered and which is difficult to knock loose.

It is another object of the instant invention to provide a seat hinge cover assembly which is connected to a member of the seat hinge so that it may not easily become dislodged therefrom and which is further arranged to allow a predetermined amount of displacment therebetween and thus alleviate the tendancy for shocks to the seat hinge cover member from damaging it and-/or dislodging it from the portion of the seat hinge member on which it is mounted.

In brief, the above object are achieved by an arrangement which wherein a pair of cover half members are attached to each other and to a seat hinge base plate in such a manner as to enclose the same. The respective cover halves each snap directly onto the base plate at a single point on their lower sides, while the upper sides of the halves snap onto each other. The connection between the covers and the base plate is sufficiently resilient to allow some movement in the event that large forces or shocks are applied to the cover. On the other hand, the connection between the cover halves is sufficiently strong so that forces acting on the cover halves cannot cause one to seperate from the other.

More specifically, a first aspect of the present invention is deemed to comprise a seat hinge cover assembly for covering a base plate of a seat hinge which features: a first cover half, the first cover half covering a first side of the base plate of the seat hinge; a second cover half, the second cover half covering a second side of the seat base plate of the seat hinge; a first base plate attachment member, the first base plate attachment member being formed on the first cover half for attaching the first cover half directly to the base plate; a second base plate attachment member, the second base plate attachment member being formed on the second cover half for attaching the second cover half directly to the base plate; and a cover half attachment means, the cover half attachment means attaching the first cover half to the second cover half.

According to another aspect of the invention, in the seat hinge cover assembly as set forth above the connection between the first cover half and the second cover half is formed at a portion of the seat hinge cover assembly that is distant from a location at which the seat cover halves are connected to the base plate of the seat hinge.

According to another aspect of the invention, the connections between the first cover half and the base plate and the second cover half and the base plate of the seat hinge are relatively close to one another on the base plate while the connection between the first cover half and the second cover half is relative distal from the connections between the first cover half and the hinge plate and the second cover half and the hinge plate.

According to yet another aspect of the invention, in the seat hinge cover assembly according to the invention the connections between the first cover half and the base plate of the seat hinge and the second cover half and the base plate of the seat hinge, are relatively close to each other on the base plate and the connection between the first cover half and the second cover half is formed on the side of the hinge plate that opposite from the side of the base plate at which the connections between the first cover half and the hinge plate and the second cover half and the hinge plate are defined.

According to still another aspect of the invention the first base plate attachment member is defined by a resilient tab formed on the first side cover member, the resilient tab engaging an edge portion of the base plate of the seat hinge for connecting the first cover member to the base plate.

In accordance with yet another facet of the invention, the cover half attachment means is defined by a resilient tab formed on one of the first side cover member and the second side cover member, the resilient tab engaging an edge portion of the one of the first side cover member and the second side cover member which the tab is not formed on, for connecting first side cover member to the second side cover member.

According to yet another inventive aspect of the instant seat hinge cover assembly, the first side member and the second side member cooperate to define a first internal space wherein the base plate is received and a second internal space discrete from the first internal space.

According to another aspect of the invention, the cover assembly is provided for covering a rigidly mounted object comprising: a first cover half, the first cover half covering a first side of the rigidly mounted object; a second cover half, the second cover half covering a second side of the rigidly mounted object; a first attachment member, the first attachment member being formed on the first cover half for attaching the first cover half directly to the rigidly mounted object; a second attachment member, the second attachment member being formed on the second cover half for attaching the second cover half directly to the rigidly mounted object; and a cover half attachment means, the attachment means attaching the first cover half to the second cover half.

DETAILED DESCRIPTION OF THE PREFERRED EMBODIMENT

An embodiment of the present invention is depicted in FIGS. 3 through 12. However, it is to be understood from the outset that the invention is in no way limited to the particular embodiment disclosed hereinafter and that various modifications and the like can made without departing from the spirit of the invention.

Figure 1:
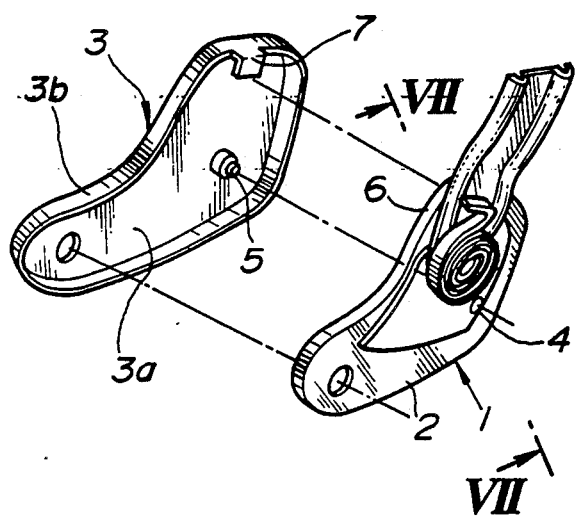
FIG. 1 is a three quarter perspective exploded view depicting a seat hinge and a seat hinge cover according to the prior art.
Figure 2:
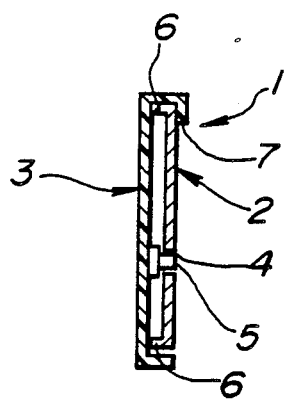
FIG. 2 is a front elevation cross-sectional view taken along section line XII—XII of FIG. 1, which depicts the engagement between the seat hinge cover member and the seat hinge base plate in the device formed according to the prior art.
Figure 3:
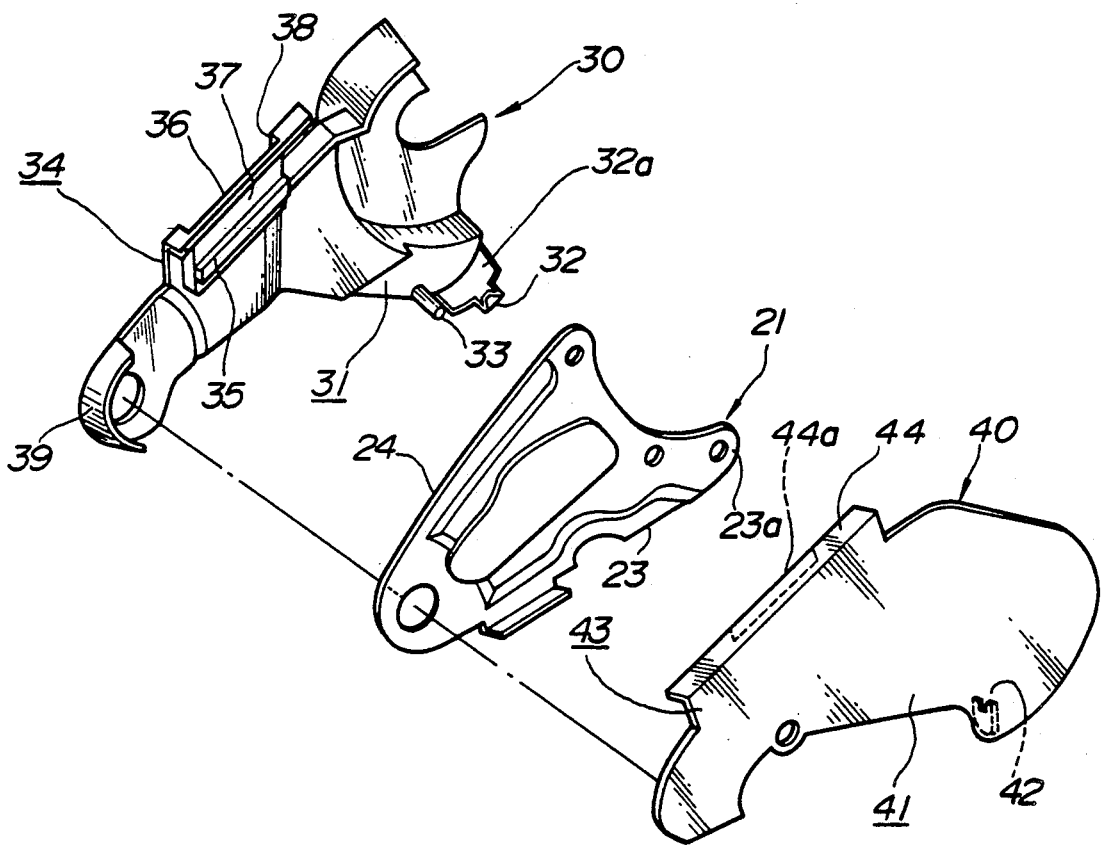
FIG. 3 is a three quarter perspective exploded view in which the essential parts including the seat hinge base plate and a seat hinge cover assembly formed according to the exemplary embodiment of the instant invention are depicted.
Figure 4:
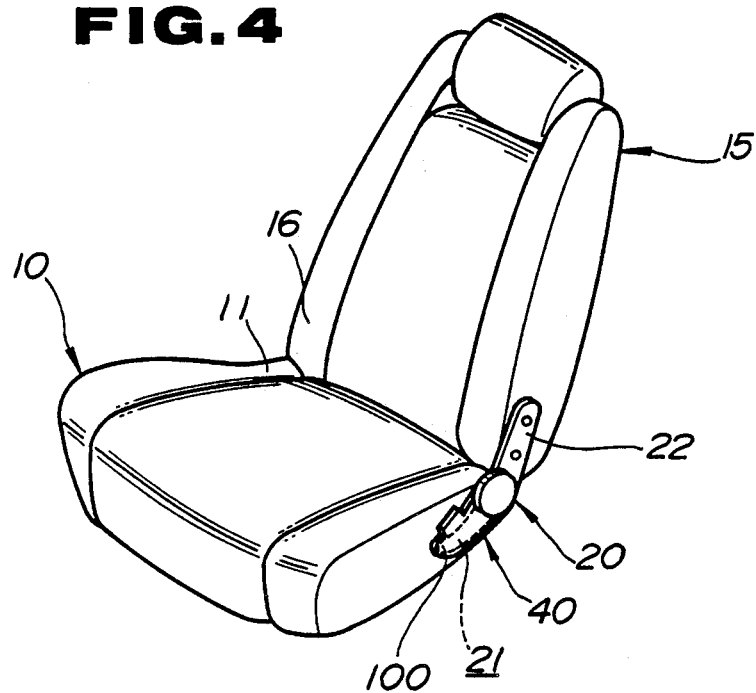
FIG. 4 is a three quarter perspective view depicting a vehicular seat on which a seat hinge and a seat hinge cover formed according to the exemplary embodiment of the instant invention, are provided.
Figure 5:
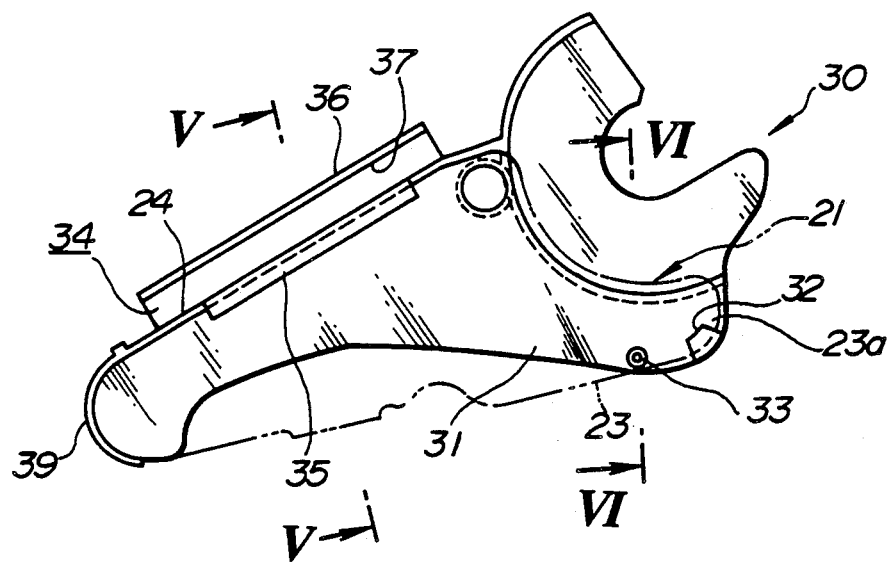
FIG. 5 is a side elevational view showing the inner side hinge cover member formed in accordance with the exemplary embodiment of the instant invention wherein the position of the hinge base plate member is shown in phantom chain lines.
Figure 6:
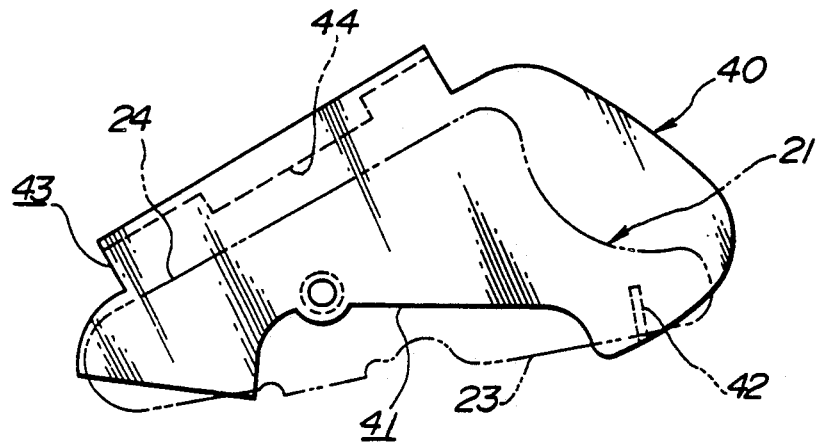
FIG. 6 is a side elevational view of the the outer side hinge cover member formed in accordance with the exemplary embodiment of the instant invention, wherein the position of the hinge base plate member is depicted in phantom chain lines and the engaging tab of the hinge cover member is indicated by the broken line.
Figure 7:
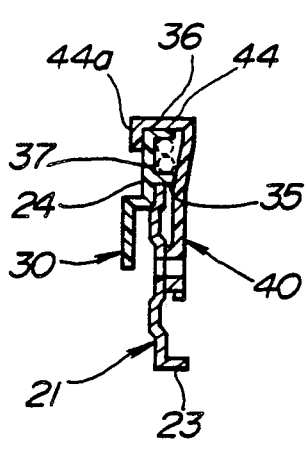
FIG. 7 is a front elevation cross-sectional view taken along section line V—V of FIG. 5 depicting the engagement between the two halves of the seat hinge cover assembly and the upper portion of the seat hinge base plate in the device formed according to the exemplary embodiment of the instant invention.
Figure 8:
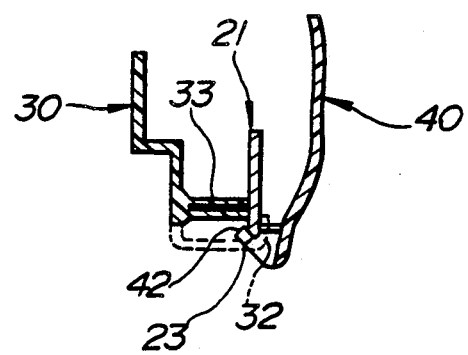
FIG. 8 is a front elevation cross sectional view taken along the line VI—VI of FIG. 5 depicting the engagement between the two halves of the seat hinge cover assembly and lower portion the seat hinge base plate in the device formed according to the exemplary embodiment of the instant invention, wherein the engaging tab and arcuate support structure formed at the rear side of the base plate are indicated by a broken line.
Figure 9:
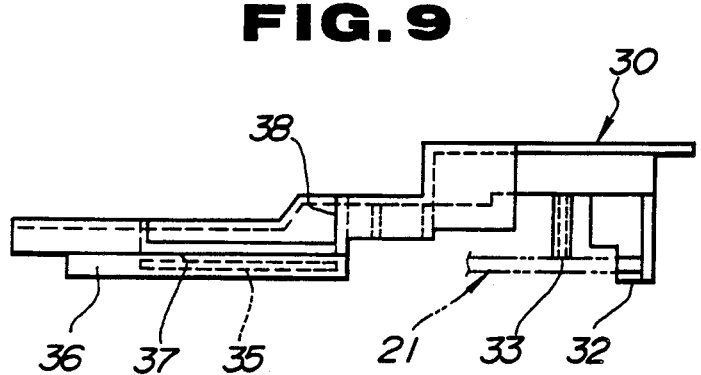
FIG. 9 is an overhead view of the inner side cover member of the seat hinge cover assembly formed in accordance with the exemplary embodiment of the instant invention, wherein a portion the base hinge plate is indicated in phantom chain lines.
Figure 10:
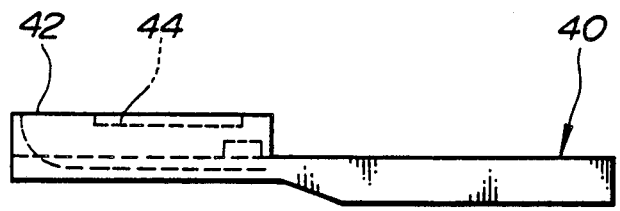
FIG. 10 is a top plan view of the outer side cover member of the seat hinge cover assembly formed in accordance with the exemplary embodiment of the instant invention.
Figure 11:
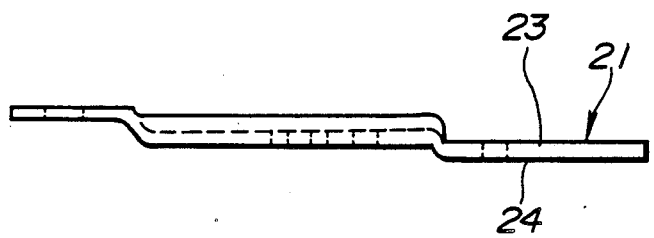
FIG. 11 is top plan view of the seat hinge base plate member to which the seat hinge cover assembly formed in accordance with the exemplary embodiment of the instant invention, is fitted.
Figure 12:
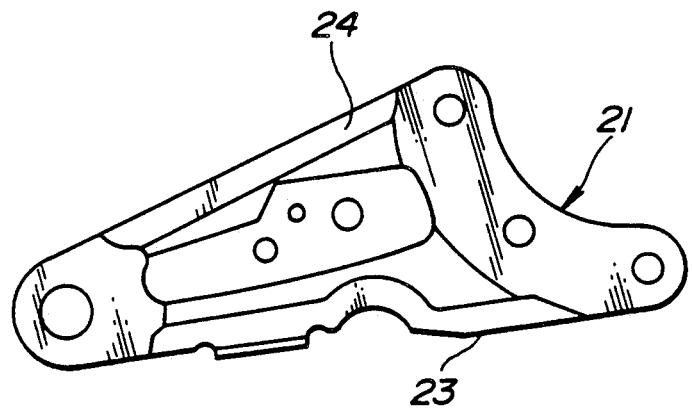
FIG. 12 is a side elevation view of the seat hinge base plate member to which the seat hinge cover assembly formed in accordance with the exemplary embodiment of the instant invention, is fitted.

In FIG. 4 the seat on which the seat hinge having the seat hinge cover formed in accordance with the instant invention is depicted. The seat comprises a seat cushion portion 10 and a seat back portion 15. The seat back portion 15 is pivotally connected to the seat cushion portion 10 through a hinge assembly so as to be pivotable in relation thereto.

The seat hinge assembly in this arrangement comprises a hinge base plate 21, a reclining adjuster 20, and a pivotable support arm 22. The hinge base plate 21 is rigidly attached to the internal frame (not shown) of the seat cushion 10 at the sides of the rear portion 11 thereof. The pivoting arm 22 of the seat hinge assembly is attached to the side of the seat back 15 at the lower side 16 thereof. The pivotable support arm 22 is pivotably connected to the seat hinge base plate 21 through a reclining adjuster 20.

The seat hinge cover assembly formed according to the exemplary embodiment of the invention, is designed to enclose the base plate 21 and conceal the same. In this instance the seat hinge cover includes an inner side cover 30 and an outer side cover 40.

The inner side cover member 30 and the outer side cover member 40 are preferably formed of a material having a certain degree of resilience.

The inner side cover 30 is provided so as to cover the inner side of the hinge base plate 21 facing the seat cushion 21.

At the lower side thereof, the inner side cover 30 comprises a small engaging tab or flange 32 which engages an edge portion 23 of the base plate 21. A spacer rod 33 is also formed integrally on the inner surface of the inner side cover 30 and is arranged to abut against the inboard face of the hinge base plate 21. As will be appreciated from FIG. 8 this spacer rod 33 engages the inboard face of the hinge base plate 21 so as to establish a predetermined spacing between the general plane of the inner side cover 30 and the hinge base plate 21.

The upper side portion 34 of the inner cover member 30 is provided with a straight edged engaging portion 35 which is arranged to engage an upper edge portion 24 of the hinge base plate 21. A projecting tab portion 36 is also formed in the vicinity of the upper side of the straight edged engaging portion 35. As shown, this projecting tab portion 36 is defined at the top edge of the upper side portion 34 of the inner cover member 30 and extends substantially parallel to the straight edged portion 35. The projecting tab portion 36 projects in the direction of the base plate 21.

A groove 37 of a predetermined width is defined between the straight edged engaging portion 35 and the projecting tab portion 36.

The outer side cover member 40 has a recessed or hook blade member 42 projecting inwards at the lower portion 41 of its inside face. The hook blade member 42 is essentially a planar member projecting inwards along a plane which is normal to the inner face of the outer side member 40. The hook blade member 42 includes a notch which receives the lower engaging edge 23 of the base plate member 21 therein.

An engaging flange 44 is formed at the upper portion 43 of the outer side cover member 40. This engaging flange protrudes over the top of the projecting tab portion 36, and includes a connection member 44a which hooks over the side of the projecting tab portion 36 of the inner side cover member 30, in a manner best appreciated from a consideration of FIG. 7.

In the above manner the connection member 44a serves to maintain the upper portion of the the outer side cover 40 in engagement with the inner side cover member 30.

While the connection member 44a holds the outer side cover member 40 onto the inner side cover member 30, the inner face of the outer side cover member is forced into engagement with the straight edged engaging portion 35.

Since a groove 37 is defined between the straight edge engaging portion 35 and the projecting tab portion 36 of the inner side cover member 30, when the outer side cover member is disposed on the inner side cover member, the groove 37 serves to define a seperate enclosed channel in the cover 100 which is auxiliary to the concealing function of the base hinge plate 21. This groove can be used to accommodate members associated with the seat such as seat belt fittings etc.

When the seat hinge cover 100 is fitted into place on the seat hinge assembly, it encloses the seat hinge base plate member 21. The outer side cover portion of the seat hinge cover is, at its lower part, coupled directly to the hinge base plate member 21 by means of the hook blade member 42 which as previously mentioned includes a notch which engagingly seats on the lower engaging edge portion 23 of the hinge base plate member 21.

The upper part of the outer hinge cover member 40 is not attached directly to the hinge base plate member 21 but instead is attached to the inner side cover member 30 by means of the engagement between the projecting tab portion 36 of the upper portion 34 of the inner side cover member 30, and the connection member 44a.

The lower part of the inner hinge cover member 30 is attached directly to the lower engaging edge portion 23 of the hinge base plate 21 by means of the locking tab 32. The inner side cover member 30 is not connected directly to the hinge base plate member 21 but, as mentioned above, is connected to the outer hinge member 40, by means of the engagement between the projecting tab portion 36 of the upper portion 34 of the inner side cover member 30, and the connecting member 44a which depends from the engaging flange 44 of the outer hinge cover member 40.

When the inner side cover member 30 is disposed on the hinge base plate member 21, the lower side face of the straight edged engaging portion 35 rests against the upper edge 24 of the base plate 21. The engagement between the lower side face of the straight edge engaging portion 35 and the upper side 24 of the hinge base plate member 21 serves to prevent the inner side cover member 30 from sliding downward. Thus, it is ensured that the engagement between the locking tab 32 and the lower engaging edge portion 23 of the hinge base plate 21 is maintained and the inner side cover member cannot slip downward and off the hinge base plate 21.

The outer, hinge cover member 40 on the other hand, does not come into direct contact with the upper side of the hinge base plate member at all so, instead of being supported by the upper side of the base plate 21 in such a manner as to be prevented from sliding downward and becoming disengaged from the lower engaging portion 23 of the hinge base plate member, the upper portion 43 of the outer hinge cover member 40 is supported by means of the engagement between the projecting tab portion 36 of the upper portion 34 of the inner side cover member 30, and the connection member 44a.

Accordingly, any downward force applied to the outer cover member 40 is exerted on the upper portion 34 of the inner side cover member 30 and is transmitted therethrough onto the upper side edge portion 24 of the base plate member 21.

Thus, while only the lower portions of the inner side cover member 30 and the outer side cover member 40, are latched directly onto the hinge base plate member 21, the upper sections of the respective inner and outer cover members 30 and 40 straddle the upper portion of the hinge base plate member and are interlocked in such a manner that the inner and outer members cannot readily detach itself from the hinge base plate member 21.

With respect to forces applied in the forward and rearward directions, it will be noted that the tab 32 of inner side cover member 30 is formed on an arcuate support member 32a which projects from the lower rear end portion of the inner side cover member 30. This arcuate support member 32a is formed so as to receive the rounded, end corner portion 23a of the lower engaging edge portion 23. Accordingly, this arcuate support member 32a engages the hinge base plate member 21 in such a manner wherein the inner side cover member is prevented from shifting forward relative to the base hinge plate 21.

Similarly, at the front end of the inner side cover member 30, an arcuate engaging flange 39 is formed. This flange 39 is formed so as to define a sector of a circle having a radius slightly larger than the curvature of the rounded front corner portion of the hinge base plate 21. The engaging flange 39 is thus formed so as to receive the rounded, front end corner portion of hinge base plate 21. Thus, the arcuate engaging flange 39 engages the hinge base plate member 21 in such a manner wherein the inner side cover member is prevented from shifting rearward relative to the base hinge plate 21.

The arcuate engaging flange 39 is formed so as to project outwardly and away from the seat cushion beyond the outer surface of the hinge base plate member 21 to the degree that it also partially encircles the rounded front corner portion of the outer side cover member 40 thus it also serves to prevent the outer side cover member 40 from sliding or shifting forward with respect to the base hinge plate member 21.

The hinge cover assembly 100 is easily put together during the assembly of the seat by snapping the inner side cover member 30 over the inner side portion of the seat hinge base plate member 21 in such a manner as to place the upper straight edge engaging portion 35 of the inner side cover member 30 in a position wherein it engages the top edge portion 24 of the base plate member 21.

On the other hand, the arcuate supporting member is positioned in the vicinity of the rear rounded lower corner 23a of the engaging portion 23 and the inner cover member 30 is pressed outwards so as to cause the tab 32 to snap over engaging portion of the hinge base plate 21. The inner side member 30 therefore becomes attached to the inner side of the base plate member 21.

Thereafter, the outer side cover member 40 is positioned over the outer portion of the hinge base plate member 21 onto which the inner side cover member 30 has been fitted. The lower side portion 41 of the outer side cover 40 on which the hook blade member 42 is formed is then pressed inwards so that the notch in the hook blade member 42 receives the lower edge engaging portion 23 of the hinge plate 21 therein.

The upper side of the outer cover member 40, on which the engaging flange 44 is formed, is pressed inwards so as to engage the back side of the projecting portion tab 36 of the inner side hinge plate cover member 30. During this operation the inner side hinge plate cover member 30 is supported from the back so as to prevent the force by which the outer side hinge cover member 40 is pressed on, from dislodging the straight edged engaging portion 35 of the inner side cover member 30 from the upper surface of the base plate 21.

With the above construction, the hinge cover assembly 100 is only firmly connected directly to the hinge base plate 21 at the lower engaging portion 23 thereof, and, due to the inherent resilience of the material from which the inner and outer side cover members 30 and 40 are formed, the connection between the hinge cover assembly 100 and the base hinge mechanism exhibits a desirable amount of flexibility.

It will be noted that with the above construction, the two halves, defined by the inner side cover portion 30 and the outer side cover portion 40, of the hinge cover assembly 100 are quite firmly connected to each other and in a manner to enclose the base hinge plate 21. Accordingly, the resilience and ease with which the attachment of the hinge cover assembly can be achieved are ensured while still allowing the cover assembly to quickly easily and firmly attached to the hinge base plate member 21.

It will be further noted the connection between the upper parts of the respective inner and outer side cover halves 30 and 40 is made at the top of the upper portion 34 which serves as a buffer between the connected portions of the respective cover halves 30 and 40 and the upper side 24 of the base plate 21.

Since the two halves defined by the respective inner and outer side cover members 30 and 40 of the hinge cover assembly are locked firmly together they define a structural unit having an internal space which is independent of the hinge base plate 21. Therefore, strong shocks on either the inner side cover member 30 or the outer side cover member 40, cause the two members to move together as a unit with respect to the base hinge plate member 21 while pivoting slightly about the points, (which are essentially close enough together to be considered as a single point with respect to the overall structure of the hinge cover assembly 100) where they are directly and firmly connected to the base plate 21.

As a result of the flexibility of the connection between the hinge cover assembly and the hinge base plate 21, and the firm connection between the two halves (viz., the inner and outer side cover members 30 and 40) of the seat hinge cover assembly 100, relative movement between the seat hinge cover assembly 100 and the hinge base plate member 21 is possible without incurring the danger of the seat hinge cover assembly 100 becoming dislodged.

On the other hand, assembly is easy and quick since the inventive seat hinge cover assembly 100 can be quickly and easily snapped onto the seat hinge base plate member 21 without any complicated fastening procedures and with the same ease as in the case of the prior art discussed in the opening paragraphs of the instant disclosure.

What is more, the two halves defined by the inner and outer side cover members 30 and 40 of the seat hinge cover assembly 100 cooperate to define an additional internal space, due to the provision of the groove 37, which space is separate and discrete from the internal space in which the hinge base plate member 21 is enclosed. Therefore, members such as seat belt parts or wiring or any other members which may be associated with the seat can be disposed within this space defined within the groove 37 and thus removed from the danger of being damaged or pinched in the event that the seat hinge cover assembly shifts with respect to the hinge base plate 21.

What is claimed is:

1. An assembly for use with a seat hinge, comprising:
 a base plate of said seat hinge;
 a first cover half covering a first side of said base plate;
 a second cover half covering a second side of said seat base plate;

a first base plate attachment member formed on said first cover half for attaching said first cover half directly to said base plate;

a second base plate attachment member formed on said second cover half for attaching said second cover half directly to said base plate; and a cover half attachment means for attaching said first cover half to said second cover half, wherein said base plate has an edge portion and said first base plate attachment member is defined by a first resilient tab extending laterally from said first cover half and engaging on the edge portion of the base plate for connecting said first cover half to said base plate.

2. An assembly as claimed in claim 1, wherein said first resilient tab is formed on an arcuate support member which projects from said first cover half toward said base plate.

3. An assembly as claimed in claim 2, wherein said first cover half in integrally formed with a straight edged engaging portion which is arranged to engage said second cover half.

4. An assembly as claimed in claim 3, in which said first cover half is integrally formed with a spacer rod which is arranged to abut against said first side of said base plate.

5. An assembly as claimed in claim 4, wherein the abutment of said spacer rod against the first side of the base plate establishes a predetermined spacing between the first cover half and the base plate.

6. An assembly as claimed in claim 4, wherein said first cover half is integrally formed at one end thereof with an arcuate engaging flange b which one end of said base plate and said second cover half are covered.

7. An assembly as claimed in claim 4, in which said second base plate attachment member is a hook blade member integrally formed on said second cover half, said hook blade member having a notch for receiving therein a lower edge of said base plate.

8. An assembly as claimed in claim 1, wherein said cover half attachment means is defined by a second resilient tab extending laterally from one of said first and second cover halves for engaging an edge portion of the other of said first and second cover halves for connecting said first and second cover halves.

9. An assembly for use with a seat hinge, comprising:
a base plate of said seat hinge,
a first cover half covering a first side of said base plate;
a second cover half covering a second side of said base plate;
a first base plate attachment member formed on said first cover half for attaching said first cover half directly to said base plate;
a second base plate attachment member formed on said second cover half for attaching said second cover half directly to said base plate; and
a cover half attachment means for attaching said first cover half to said second cover half,
wherein said cover half attachment means is defined by a resilient tab extending laterally from one of said first and second cover halves for engaging an edge portion of the other of said first and second cover halves for connecting said first and second cover halves.

10. An assembly as claimed in claim 9, wherein said edge portion of the other cover half forms a flange which protrudes over said resilient tab, said flange including a connection member which hooks over said resilient tab.

* * * * *